United States Patent
Han et al.

(10) Patent No.: US 9,059,826 B2
(45) Date of Patent: Jun. 16, 2015

(54) APPARATUS AND METHOD FOR TRANSMITTING AND RECEIVING CHANNEL STATE INFORMATION REFERENCE SYMBOL IN RELAY NETWORK SYSTEM

(75) Inventors: Jung-Su Han, Yongin-si (KR); Hi-Chan Moon, Yongin-si (KR); Joon-Young Cho, Suwon-si (KR); Jun-Sung Lim, Seoul (KR); Jin-Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 684 days.

(21) Appl. No.: 13/027,767

(22) Filed: Feb. 15, 2011

(65) Prior Publication Data

US 2011/0200137 A1    Aug. 18, 2011

(30) Foreign Application Priority Data

Feb. 18, 2010  (KR) .......................... 10-2010-0014867

(51) Int. Cl.
*H04L 5/00* (2006.01)
*H04W 72/12* (2009.01)
*H04W 84/04* (2009.01)

(52) U.S. Cl.
CPC ............ *H04L 5/0048* (2013.01); *H04L 5/0023* (2013.01); *H04L 5/0053* (2013.01); *H04W 72/1273* (2013.01); *H04W 84/047* (2013.01)

(58) Field of Classification Search
USPC ............... 370/355, 279, 295, 316; 455/422.1
See application file for complete search history.

(56) References Cited

U.S. PATENT DOCUMENTS

| | | | |
|---|---|---|---|
| 2010/0323684 A1* | 12/2010 | Cai et al. ..................... | 455/422.1 |
| 2011/0116437 A1* | 5/2011 | Chen et al. ..................... | 370/312 |
| 2011/0199986 A1* | 8/2011 | Fong et al. ..................... | 370/329 |
| 2011/0249602 A1* | 10/2011 | Wennstrom et al. .......... | 370/310 |
| 2012/0002596 A1* | 1/2012 | Kim et al. ..................... | 370/315 |
| 2012/0120842 A1* | 5/2012 | Kim et al. ..................... | 370/252 |
| 2012/0120903 A1* | 5/2012 | Kim et al. ..................... | 370/329 |
| 2012/0155561 A1* | 6/2012 | Seo et al. ...................... | 375/260 |

OTHER PUBLICATIONS

Kim et al., Human translation of Korean portions of U.S. Appl. No. 61/260,405 and U.S. Appl. No. 61/234,990, Translated Apr. 2013, pp. 2-46.*

* cited by examiner

*Primary Examiner* — Nicholas Jensen
(74) *Attorney, Agent, or Firm* — Jefferson IP Law, LLP

(57) ABSTRACT

An apparatus and method for transmitting/receiving a Channel State Information-Reference Symbol (CSI-RS) in a relay network system are provided. The method for transmitting a CSI-RS in a relay network system includes selecting a subframe to transmit a CSI-RS, from DownLink (DL) subframes, transmitting, to a receive end, identifying information indicating that a CSI-RS is transmitted at the selected subframe, and transmitting a CSI-RS at the selected subframe.

18 Claims, 16 Drawing Sheets

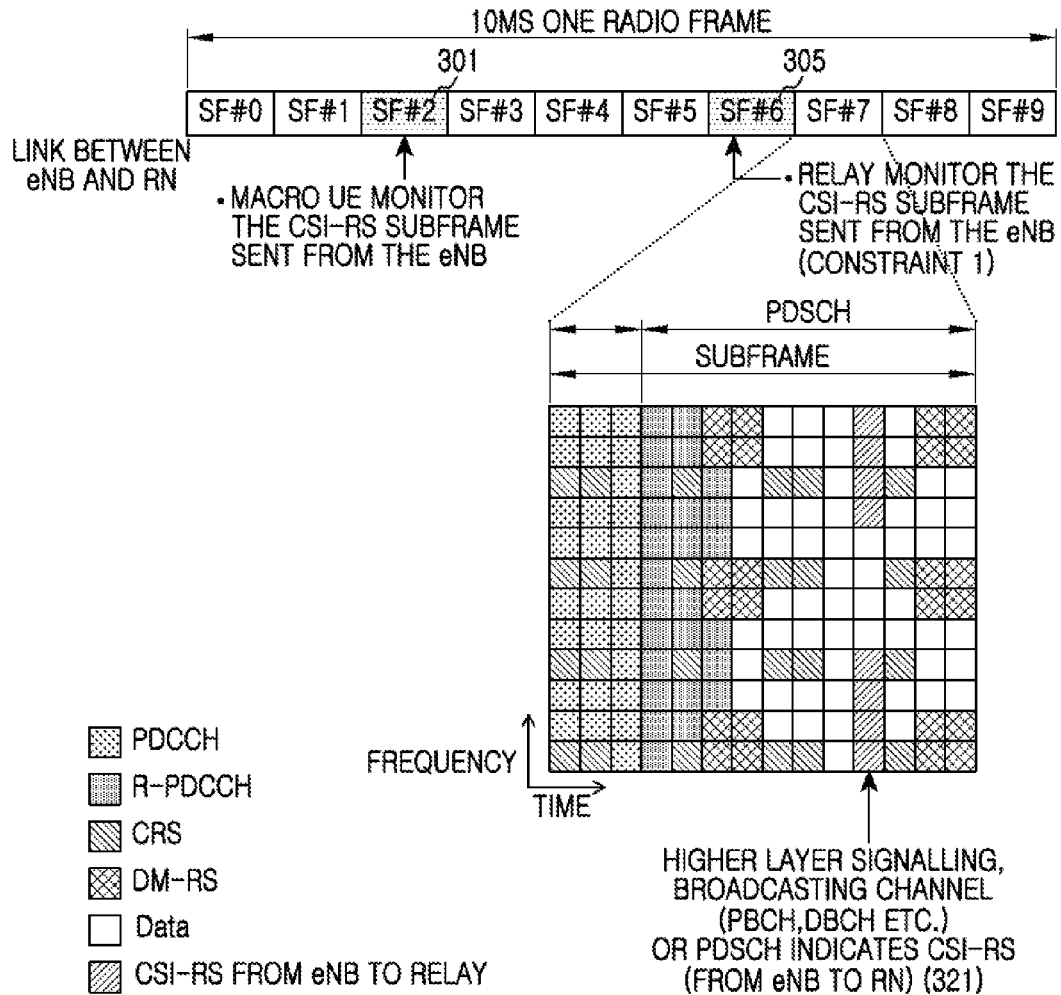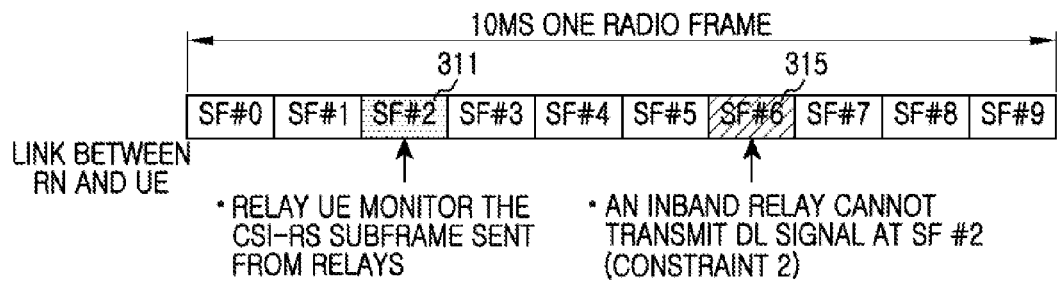
FIG.3B

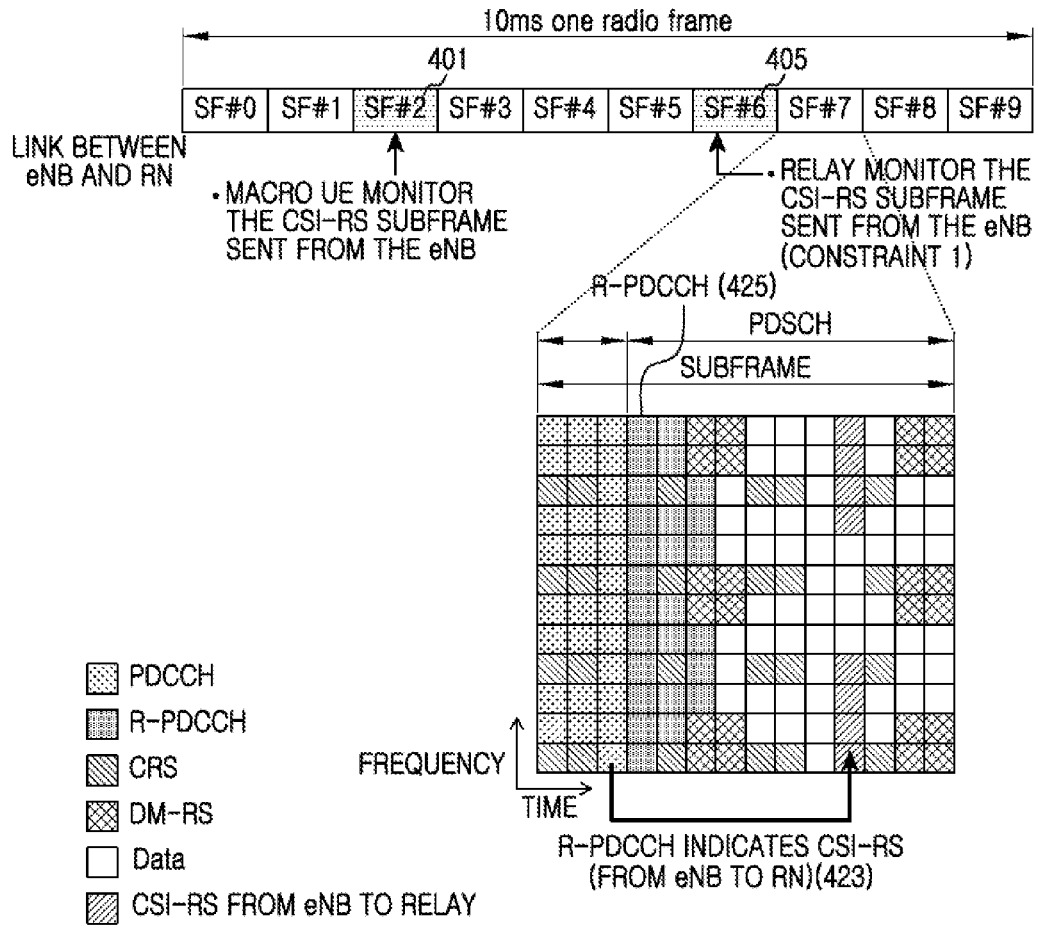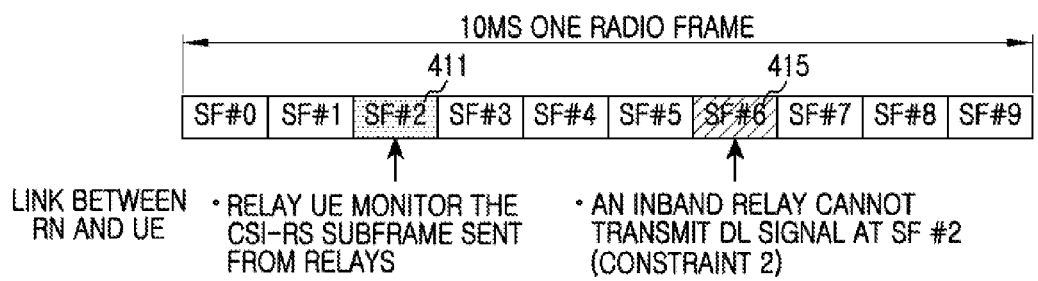
FIG.4B

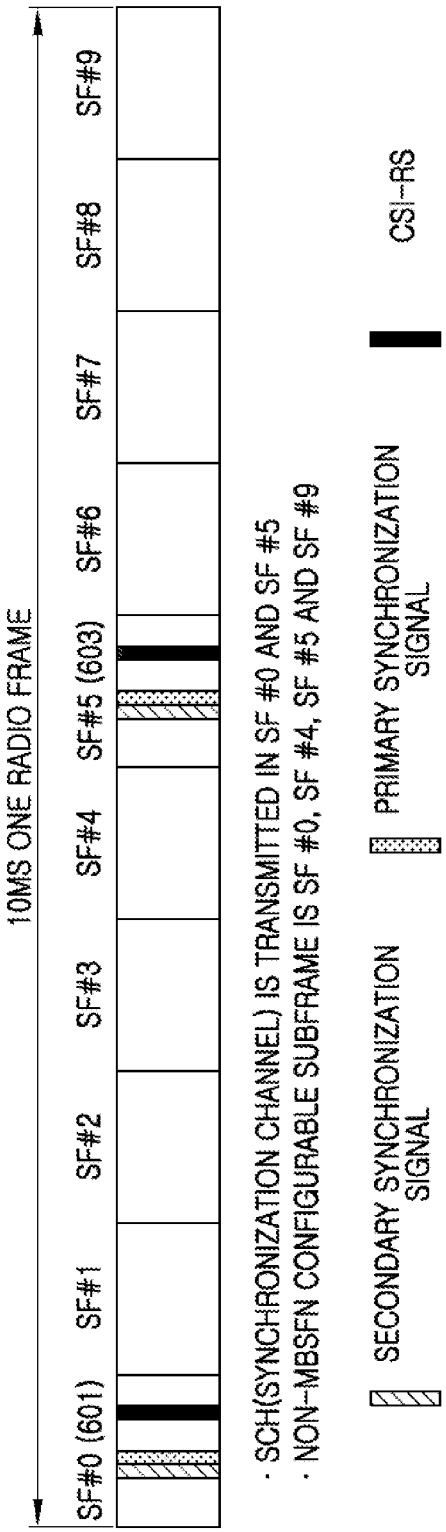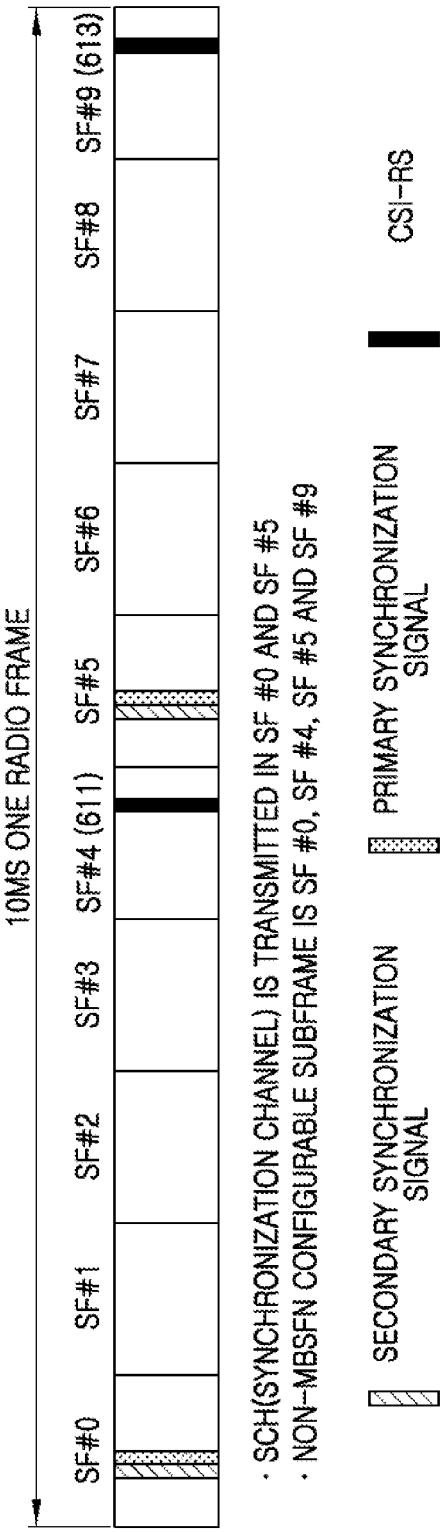

APPARATUS AND METHOD FOR TRANSMITTING AND RECEIVING CHANNEL STATE INFORMATION REFERENCE SYMBOL IN RELAY NETWORK SYSTEM

PRIORITY

This application claims priority under 35 U.S.C. §119(a) to a Korean patent application filed in the Korean Intellectual Property Office on Feb. 18, 2010 and assigned Serial No. 10-2010-0014867, the entire disclosure of which is hereby incorporated by reference.

BACKGROUND OF THE INVENTION

1. Field of the Invention

The present invention relates to a relay network system. More particularly, the present invention relates to an apparatus and method for transmitting/receiving a Channel State Information-Reference Symbol (CSI-RS) in a relay network system.

2. Description of the Related Art

For 4th-Generation (4G) mobile communication systems, technologies are being proposed for maximizing the efficiency of data transmission and for increasing the capacity of a system while guaranteeing the improvement of a data rate. 4G-based standards, such as Long Term Evolution-Advanced (LTE-A) or Institute of Electrical and Electronics Engineers (IEEE) 802.16m that is an International Mobile Telecommunications (IMT)—advanced candidate technology, include a relay technique as a scheme for improving a poor wireless channel environment caused by a shadow area and expanding a cell coverage at a small expense.

Recently, an agreement for the introduction of a Relay Node (RN) equipped with all functions of an enhanced Node B (eNB) has been reached. Discussions on a backhaul link structure and design between the eNB and the RN are presently being made. Because the RN performs communication with the eNB and a User Equipment (UE) in the same frequency band through a backhaul link and an access link, the RN may bring about serious performance degradation caused by self-interference when simultaneously supporting the backhaul link and the access link under circumstances where no isolation between a receiver and a transmitter is guaranteed.

FIG. 1 is a diagram illustrating a subframe supporting a backhaul link in a communication system supporting a Relay Node (RN) according to the conventional art.

Referring to FIG. 1, the RN time-division-multiplexes the backhaul link and the access link subframe units. An LTE-A system includes a scheme in which, as illustrated in FIG. 1, though an eNB transmits a signal to the RN, the RN sets a fake Multicast Broadcast Single Frequency Network (MBSFN) subframe 101 and transmits nothing to UEs.

The LTE-A standard is expediting the design of a new DL reference symbol such as De-Modulation-Reference Symbol (DM-RS)/Channel State Information-Reference Symbol (CSI-RS). The CSI-RS is for channel state measurement, and the design of inter-cell CSI-RS in the current standard is under discussion.

An inter-cell CSI-RS transmission scheme is mainly classified into three schemes:

Transmitting CSI-RSs of different cells in different subframes;

Transmitting CSI-RSs of different cells in different Resource Blocks (RBs); and

Transmitting CSI-RSs of different cells, for orthogonality, at the same subframe using Code Division Multiplexing (CDM), Time Division Multiplexing (TDM), or Frequency Division Multiplexing (FDM).

Among the three schemes, the scheme of transmitting the CSI-RSs at the same subframe is most effective when considering a Time Division Duplex (TDD) mode of the limited number of DownLink (DL) subframes. However, in a system time-division-multiplexing the backhaul link and the access link in subframe units as illustrated in FIG. 1, different RNs should simultaneously monitor a common CSI-RS subframe of an eNB, and the RN cannot simultaneously perform transmission and reception. Therefore, the use of the scheme of transmitting the CSI-RSs at the same subframe causes a problem illustrated in FIG. 2.

FIG. 2 illustrates a case of transmitting a CSI-RS in a communication system supporting an RN according to the conventional art.

Referring to FIG. 2, it is assumed that a period of transmission of a CSI-RS is 10 ms, and an eNB transmits the CSI-RS at a SubFrame#2 (SF#2) 201. As illustrated in FIG. 2, when the eNB transmits the CSI-RS to an RN at the SF#2 201, the RN cannot transmit a signal including the CSI-RS to a UE at a DL SF#2 203 because RNs should simultaneously monitor the SF#2 201 sent from the eNB. The system including the RN is thus not able to apply the scheme of transmitting CSI-RSs of different cells at the same subframe.

The system may transmit a CSI-RS of an eNB and a CSI-RS of an RN at different subframes but, because the RN cannot simultaneously perform transmission and reception, when the eNB transmits the CSI-RS to the RN at a specific subframe, the eNB cannot always receive a signal from the RN at the specific subframe transmitting the CSI-RS. Likewise, if the RN transmits a CSI-RS to a relay UE at a specific subframe, the RN should always transmit a signal to the relay UE at the specific subframe, and cannot receive a signal from the eNB or the relay UE. This problem becomes a main cause of decreasing the flexibility of a system at RN operation.

Accordingly, there is a need for a more reasonable CSI-RS transmission/reception scheme in order to obtain a maximum gain through efficient RN support.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting/receiving a Channel State Information-Reference Symbol (CSI-RS) in a communication system supporting a Relay Node (RN).

Another aspect of the present invention is to provide an apparatus and method for transmitting a CSI-RS of an enhanced Node B (eNB) and a CSI-RS of an RN at different subframes in a communication system supporting an RN.

Another aspect of the present invention is to provide an apparatus and method for changing a subframe transmitting a CSI-RS of an eNB and/or a CSI-RS of an RN, in a semi-static or dynamic fashion in a communication system supporting an RN.

Another aspect of the present invention is to provide an apparatus and method for transmitting, by an eNB and/or an RN, information of a subframe including a CSI-RS in a communication system supporting an RN.

Another aspect of the present invention is to provide an apparatus and method for transmitting, by an eNB and/or an RN, a CSI-RS using a subframe that is not used as a Multicast Broadcast Single Frequency Network (MBSFN) subframe in a communication system supporting an RN.

The above aspects are achieved by providing a method and apparatus for transmitting/receiving a channel state information-reference symbol in a relay network system.

According to an aspect of the present invention, a method for transmitting a Channel State Information-Reference Symbol (CSI-RS) in a transmit end is provided. The method includes selecting a subframe to transmit a CSI-RS, from DownLink (DL) subframes, transmitting, to a receive end, identifying information indicating that a CSI-RS is transmitted at the selected subframe, and transmitting a CSI-RS at the selected subframe.

According to another aspect of the present invention, a method for receiving a CSI-RS in a receive end is provided. The method includes receiving identifying information indicating that a CSI-RS is transmitted at a specific frame, from a transmit end, and receiving a CSI-RS at the specific subframe according to the received identifying information.

According to another aspect of the present invention, an apparatus for transmitting a CSI-RS in a transmit end is provided. The apparatus includes a controller for selecting a subframe to transmit a CSI-RS, from DL subframes, an inserter for inserting a CSI-RS into the selected subframe, and a transmitter for transmitting, to a receive end, identifying information indicating that a CSI-RS is transmitted at the selected subframe, and a subframe into which the CSI-RS is inserted.

According to another aspect of the present invention, an apparatus for receiving a CSI-RS in a receive end is provided. The apparatus includes a receiver for receiving identifying information indicating that a CSI-RS is transmitted at a specific frame, from a transmit end, a controller for determining that a CSI-RS exists in a specific subframe according to the received identifying information, and an extractor for extracting a CSI-RS from the specific subframe according to the control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings in which:

FIGS. 3A and 3B are diagrams illustrating a semi-static CSI-RS transmission/reception scheme in a communication system supporting an RN according to an exemplary embodiment of the present invention;

FIGS. 4A and 4B are diagrams illustrating a dynamic CSI-RS transmission/reception scheme in a communication system supporting an RN according to an exemplary embodiment of the present invention;

FIG. 6 is a diagram illustrating a scheme of transmitting a CSI-RS using a non-Multicast Broadcast Single Frequency Network (MBSFN) subframe in a communication system supporting an RN according to an exemplary embodiment of the present invention;

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for, while transmitting a Channel State Information-Reference Symbol (CSI-RS) of an enhanced Node B (eNB) and a CSI-RS of a Relay Node (RN) at different subframes, changing the subframe transmitting the CSI-RS of the eNB and/or the CSI-RS of the RN in a semi-static or dynamic fashion or determining to transmit the CSI-RS at a non-Multicast Broadcast Single Frequency Network (non-MB SFN) subframe, and informing an RN or a relay User Equipment (UE) of information of the subframe including the CSI-RS in a communication system supporting an RN.

Figure 1:
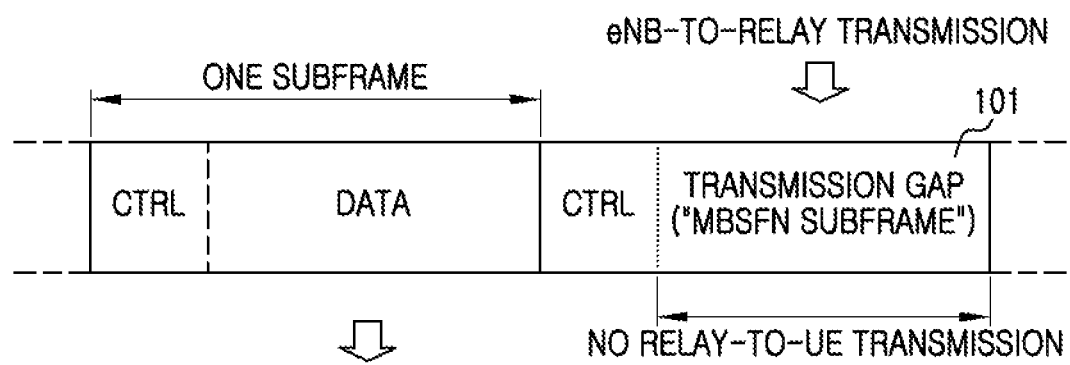
FIG. 1 is a diagram illustrating a subframe supporting a backhaul link in a communication system supporting a Relay Node (RN) according to the conventional art.
Figure 2:
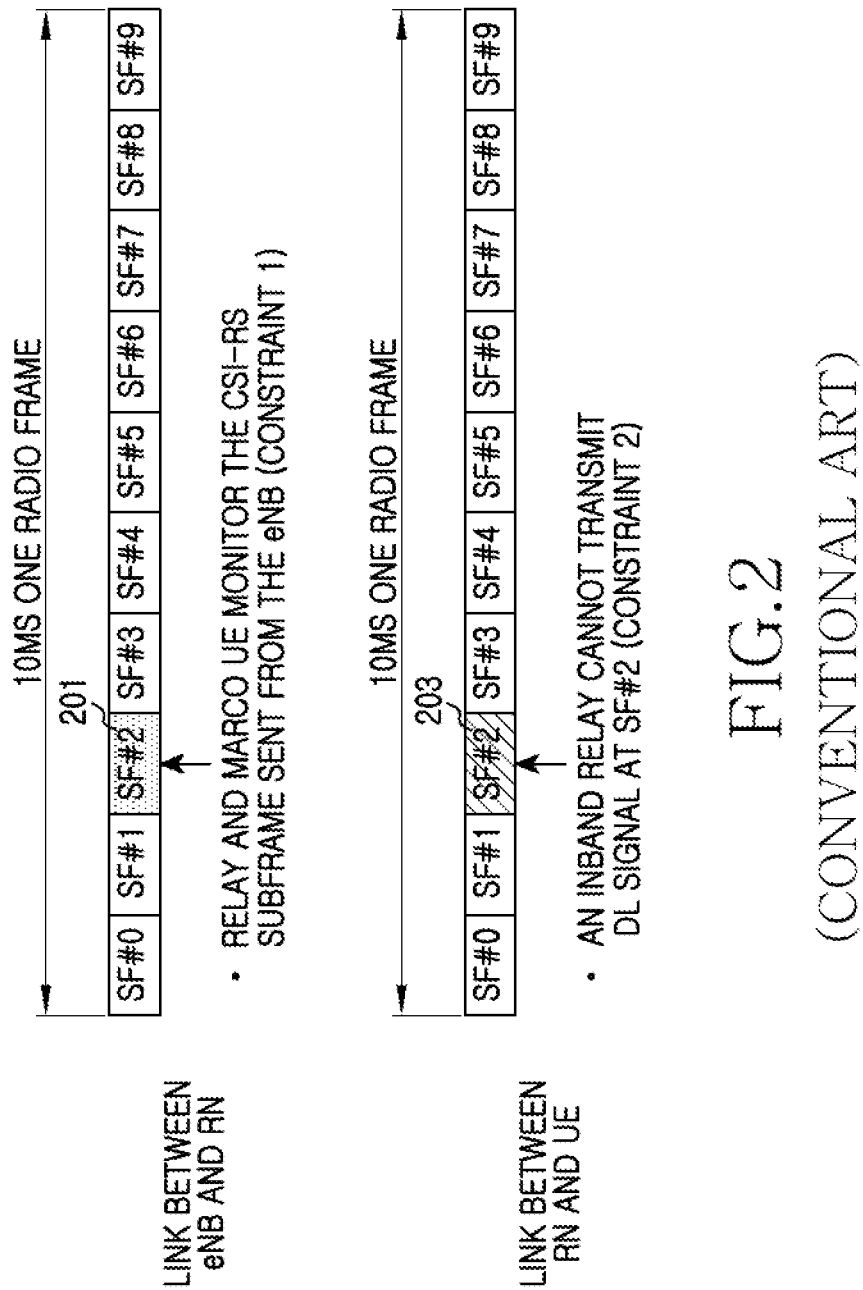
FIG. 2 is a diagram illustrating a case of transmitting a Channel State Information-Reference Symbol (CSI-RS) in a communication system supporting an RN according to the conventional art.
Figure 3A:
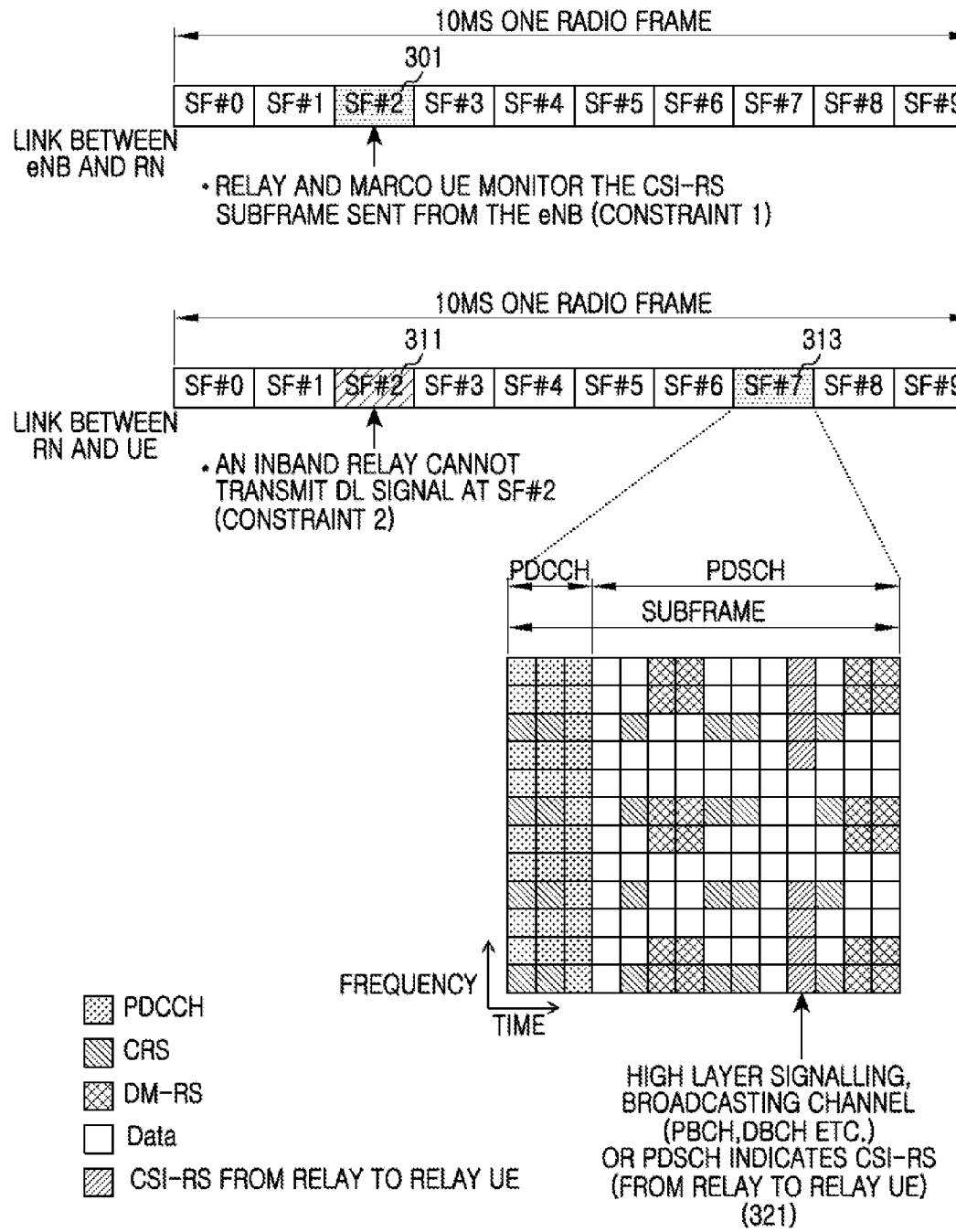

FIGS. 3A and 3B illustrate a semi-static CSI-RS transmission/reception scheme in a communication system supporting an RN according to an exemplary embodiment of the present invention. Described herein is a scheme in which an eNB or an RN determines and allocates a subframe transmitting a CSI-RS in a semi-static fashion, and transmits information on the subframe through higher layer signaling, a broadcasting channel (i.e., a Primary Broadcast CHannel (PBCH), a Dynamic Broadcast CHannel (DBCH), etc.) or a Physical Downlink Shared CHannel (PDSCH).

Referring to FIG. 3A, if an eNB transmits CSI-RSs to an RN and a macro UE at an SF#2 301, the RN monitors the CSI-RS sent from the eNB at the SF#2 301, and does not use a DownLink (DL) SF#2 311 for a relay UE. Instead, the RN selects a different DL subframe (e.g., an SF#7 313) other than the DL SF#2 311 for the sake of the relay UE, and transmits the CSI-RS to the relay UE through the selected SF#7 313. The RN may indicate that the selected SF#7 313 has included the CSI-RS, through the higher layer signaling, the broadcasting channel, or the PDSCH. For example, the RN transmits, through the higher layer signaling, information 321 of a number of the subframe including the CSI-RS, a position and pattern of the CSI-RS in the subframe, and the like to the relay UE, whereby the relay UE acquires the information 321 necessary for CSI-RS reception. The RN may transmit, every predetermined cycle, the information 321 on the CSI-RS through the higher layer signaling, the broadcasting channel, or the PDSCH, or may transmit the information 321 on the CSI-RS when the subframe of transmission of the CSI-RS changes or when the position or pattern of the CSI-RS changes within the same subframe.

Referring to FIG. 3B, if an eNB transmits a CSI-RS to a macro UE at an SF#2 301 and transmits a CSI-RS to an RN at an SF#6 305, the RN monitors the CSI-RS sent from the eNB at the SF#6 305, and does not use a DL SF#6 315 for a relay UE. Instead, the RN may select a different DL subframe (e.g., an SF#2 311) other than the DL SF#6 315 for the sake of the relay UE, and transmit the CSI-RS to the relay UE through the selected SF#2 311. Because both the CSI-RS transmitted from the eNB to the macro UE and the CSI-RS transmitted from the RN to the relay UE are transmitted at the same subframe (i.e., the SF#2 301 and the SF#2 311), the CSI-RS of the eNB and the CSI-RS of the RN should be transmitted to have orthogonality to each other. Also, the eNB may indicate that the selected SF#2 311 has included the CSI-RS, through the higher layer signaling, the broadcasting channel, or the PDSCH.

For example, the eNB may transmit, through the higher layer signaling, information 321 of a number of the subframe including the CSI-RS, a position and pattern of the CSI-RS in the subframe, and the like to the RN, whereby the RN acquires the information 321 necessary for CSI-RS reception. The eNB may transmit the information 321 on the CSI-RS every predetermined cycle, or may transmit the information 321 on the CSI-RS when the subframe of transmission of the CSI-RS changes or when the position or pattern of the CSI-RS changes within the same subframe.

For convenience, a description has been made of a scheme in which an RN selects a subframe to transmit a CSI-RS and transmits information on the subframe, and a scheme in which an eNB selects a subframe to transmit a CSI-RS and transmits information on the subframe through FIGS. 3A and 3B. The schemes illustrated in FIGS. 3A and 3B may be used in combination.

Figure 4A:
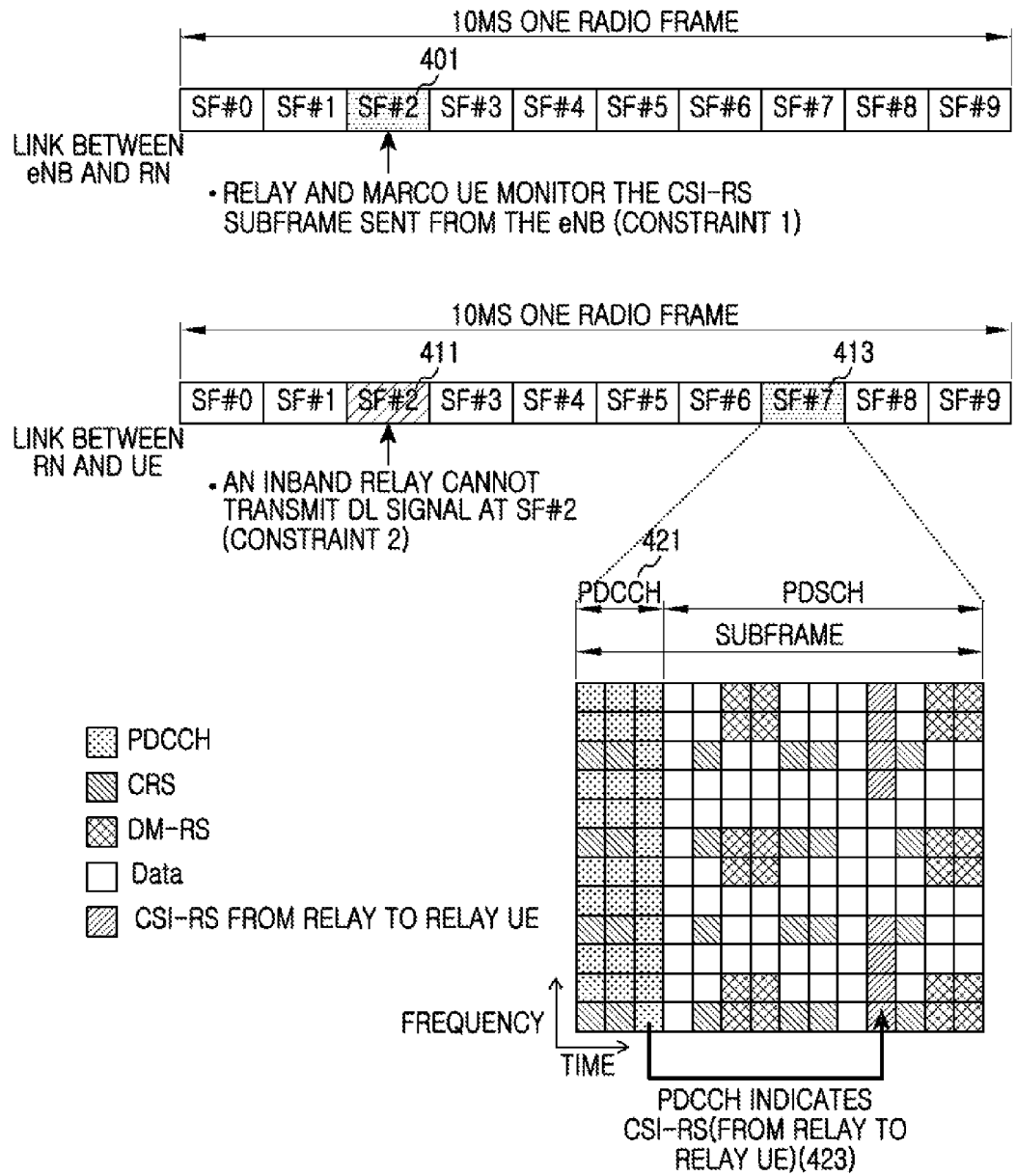

FIGS. 4A and 4B illustrate a dynamic CSI-RS transmission/reception scheme in a communication system supporting an RN according to an exemplary embodiment of the present invention. Described herein is a scheme in which an eNB or an RN determines and allocates a subframe transmitting a CSI-RS in a dynamic fashion, and transmits information on the subframe through a PDCCH.

Referring to FIG. 4A, if an eNB transmits CSI-RSs to an RN and a macro UE at an SF#2 401, the RN monitors the CSI-RS sent from the eNB at the SF#2 401, and does not use a DL SF#2 411 for a relay UE. Instead, the RN selects a different DL subframe (e.g., an SF#7 413) other than the DL SF#2 411 for the sake of the relay UE, and transmits the CSI-RS to the relay UE through the selected SF#7 413. The RN may indicate that the selected SF#7 413 has included the CSI-RS, through a PDCCH 421 of the selected SF#7 413. For example, the RN includes, in the PDCCH 421 of the SF#7 413, information 423 such as the existence or non-existence of the CSI-RS in the SF#7 413, a position and pattern of the CSI-RS in the SF#7 413 and the like, and transmits the information 423 to the relay UE, whereby the relay UE acquires the information 423 necessary for CSI-RS reception. The RN may transmit, every subframe, information indicating through a PDCCH the existence or non-existence of a CSI-RS in a corresponding subframe and, when the CSI-RS exists, may transmit position and pattern information on the CSI-RS together.

Referring to FIG. 4B, if an eNB transmits a CSI-RS to a macro UE at an SF#2 401 and transmits a CSI-RS to an RN at an SF#6 405, the RN monitors the CSI-RS sent from the eNB at the SF#6 405, and does not use a DL SF#6 415 for a relay UE. Instead, the RN may select a different DL subframe (e.g., an SF#2 411) other than the DL SF#6 415 for the sake of the relay UE, and transmit the CSI-RS to the relay UE through the selected SF#2 411. Because both the CSI-RS transmitted from the eNB to the macro UE and the CSI-RS transmitted from the RN to the relay UE are transmitted at the same subframe (i.e., the SF#2 401 and the SF#2 411), the CSI-RS of the eNB and the CSI-RS of the RN should be transmitted to have orthogonality to each other. The eNB may indicate that the SF#6 405 has included the CSI-RS, through an R-PDCCH 425 of the SF#6 405 transmitting the CSI-RS.

For example, the eNB includes, in the R-PDCCH 425 of the SF#6 405, information 423 such as the existence or non-existence of the CSI-RS in the SF#6 405, a position and pattern of the CSI-RS in the SF#6 405 and the like, and transmits the information 423 to the RN, whereby the RN acquires the information necessary for CSI-RS reception. The eNB may transmit information indicating through a PDCCH the existence or non-existence of a CSI-RS in a corresponding subframe every subframe and, when the CSI-RS exists, may transmit position and pattern information on the CSI-RS together. The R-PDCCH 425 denotes a downlink control channel transmitted from the eNB to the RN through a backhaul link.

For convenience, a description has been made of a scheme in which an RN selects a subframe to transmit a CSI-RS and transmits information on the subframe and a scheme in which an eNB selects a subframe to transmit a CSI-RS and transmits information on the subframe through FIGS. 4A and 4B. The schemes illustrated in FIGS. 4A and 4B may be used in combination.

Figure 5A:
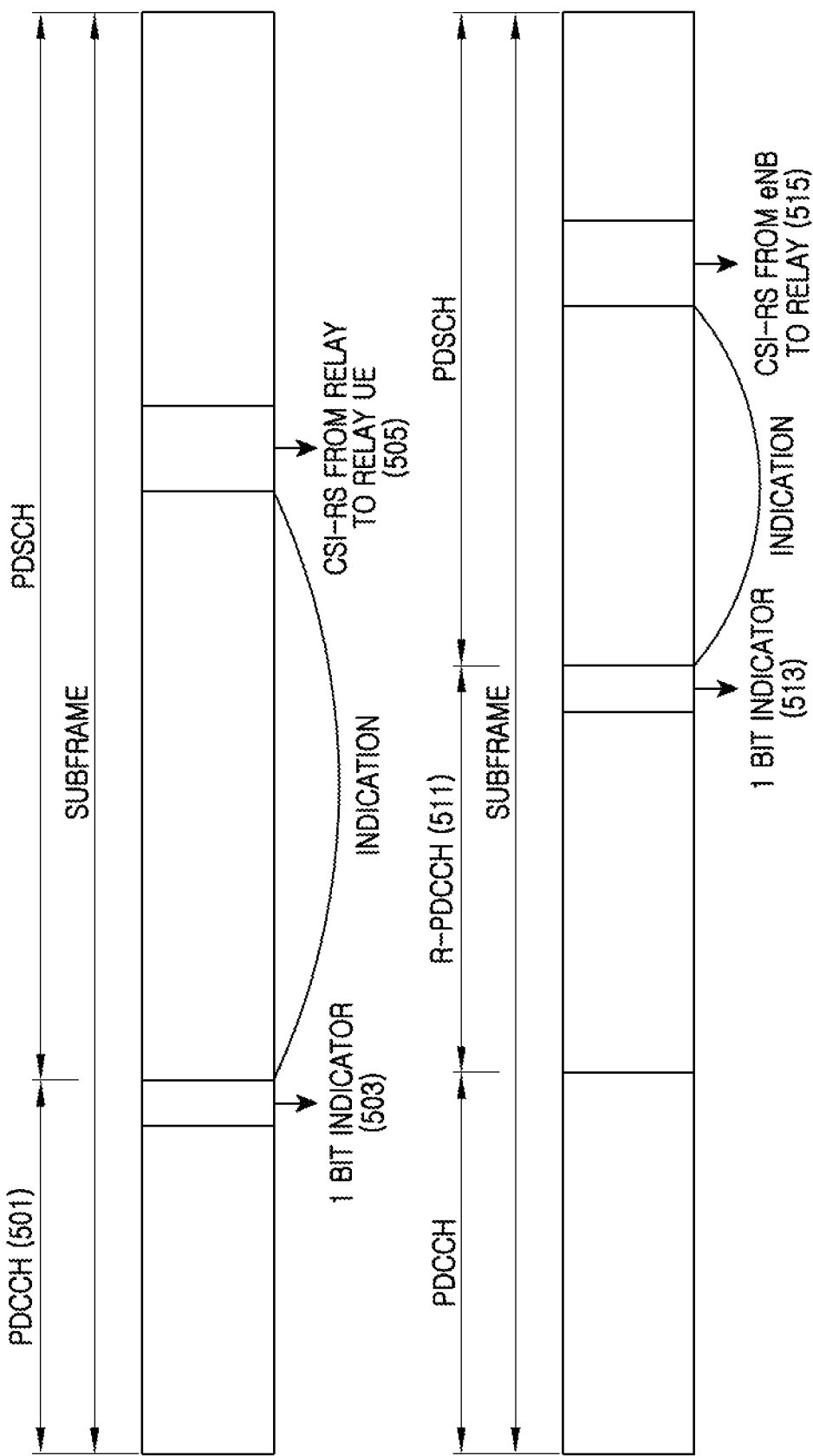
FIGS. 5A to 5C are diagrams illustrating a dynamic CSI-RS information transmission/reception scheme in a communication system supporting an RN according to an exemplary embodiment of the present invention.
Figure 5B:
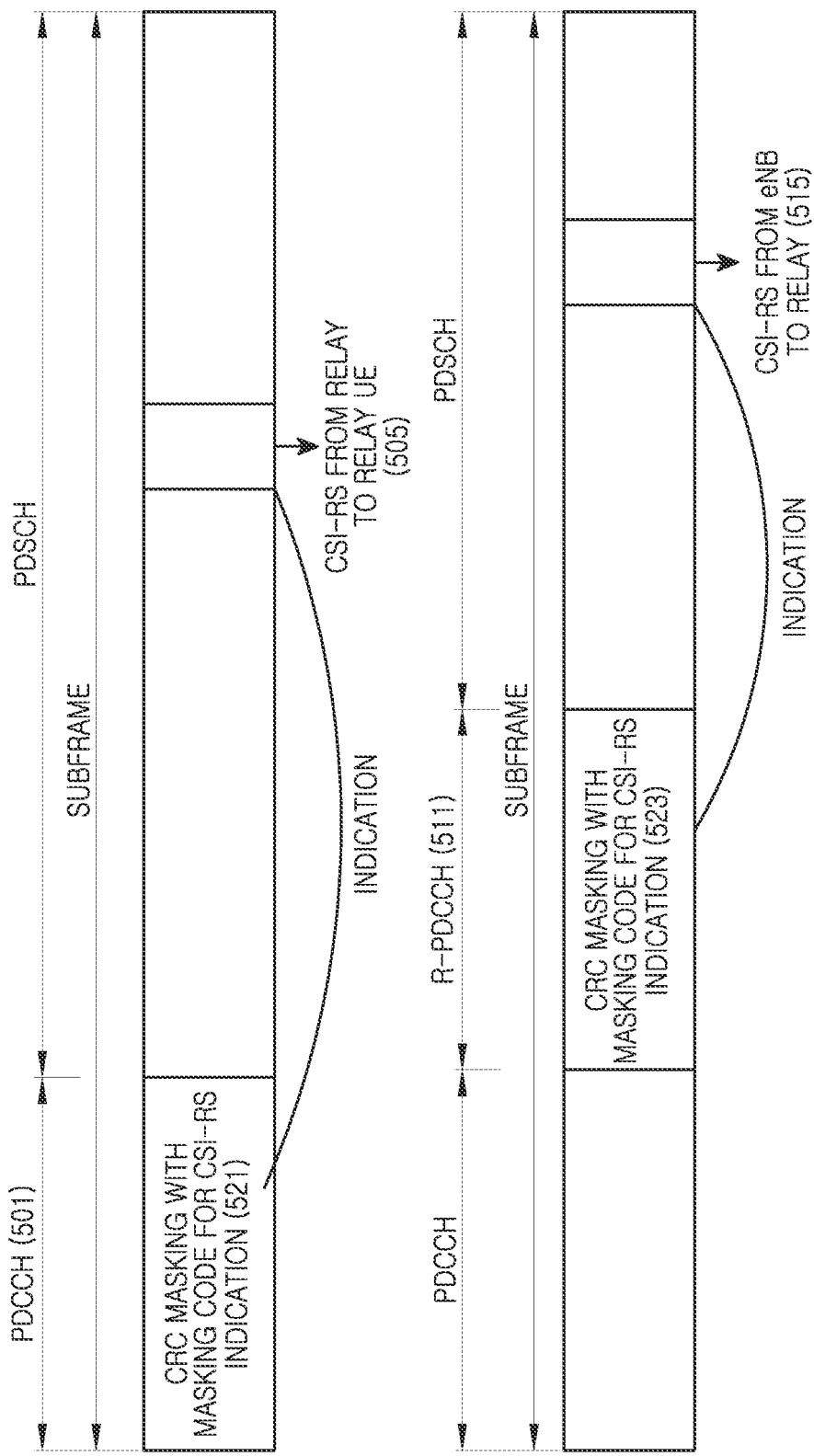
Figure 5C:
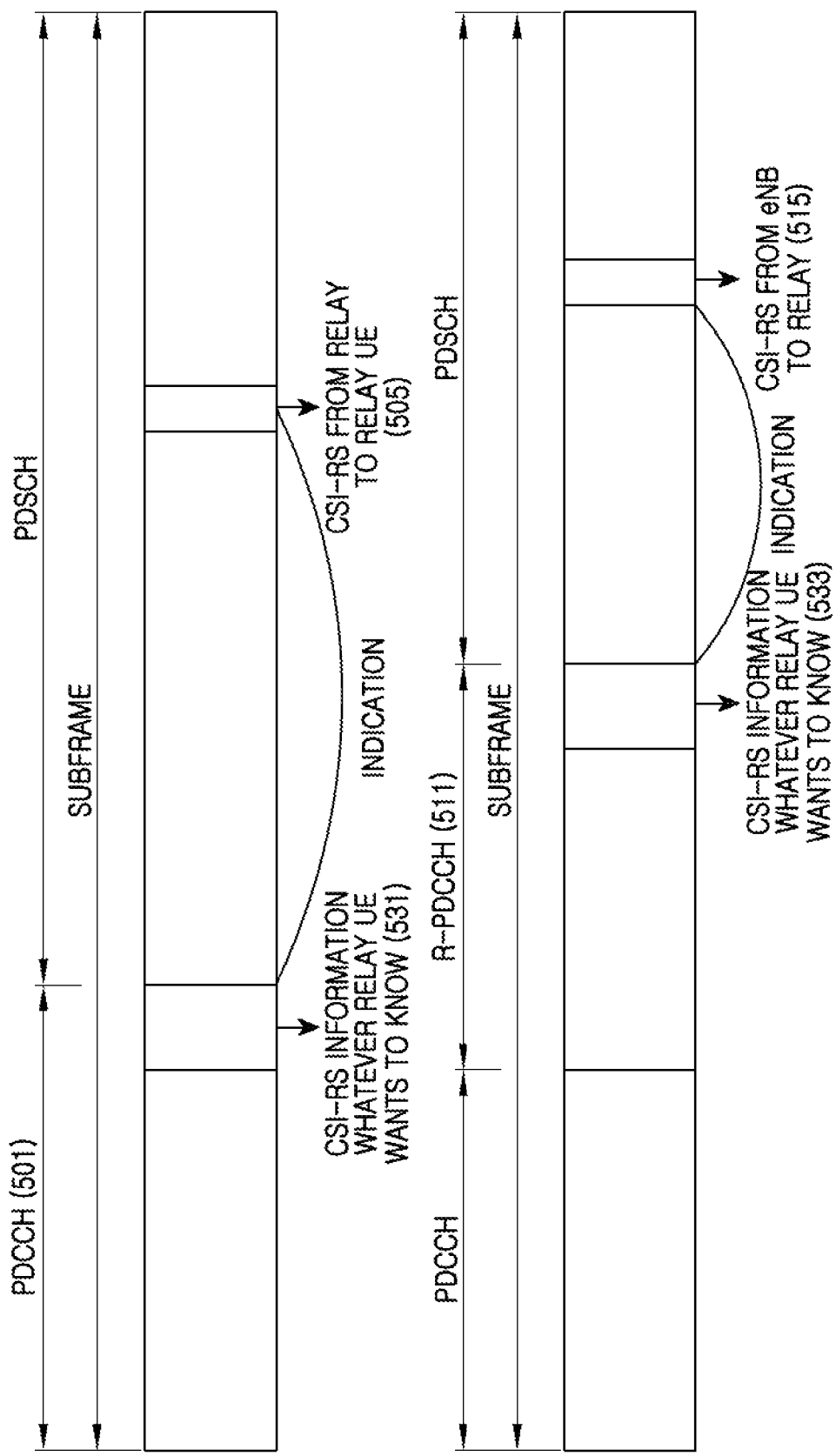

FIGS. 5A to 5C illustrate a dynamic CSI-RS information transmission/reception scheme in a communication system supporting an RN according to an exemplary embodiment of the present invention.

Referring to FIG. 5A, an RN may add a 1-bit indicator 503 to a PDCCH 501 of every subframe and indicates if a CSI-RS 505 exists in a corresponding subframe. An eNB may add a 1-bit indicator 513 to an R-PDCCH 511 of every subframe and indicate if a CSI-RS 515 exists in a corresponding subframe. Accordingly, a relay UE of the RN or an RN of the eNB may recognize that the CSI-RS exists in the corresponding subframe when a bit of the 1-bit indicator 503 or 513 included in the PDCCH 501 or R-PDCCH 511 of the subframe is equal to '1', and that no CSI-RS exists in the corresponding subframe when the bit of the 1-bit indicator 503 or 513 is equal to '0'. Positions and patterns of the CSI-RSs 505 and 515 in the subframes should be predefined between the RN and the relay UE and between the eNB and the RN, because the RN or the eNB indicates only the existence or non-existence of the CSI-RS in the corresponding subframe. This scheme adds only 1 bit so as to indicate the existence or non-existence of a CSI-RS in a corresponding subframe and thus, can minimize an increase of a control signal payload.

Referring to FIG. 5B, an RN masks 521 a Cyclic Redundancy Check (CRC) inserted into a PDCCH 501 of every subframe and indicates if a CSI-RS 505 exists in a corresponding subframe. An eNB masks 523 a CRC inserted into an R-PDCCH 511 of every subframe and indicates if a CSI-RS 515 exists in a corresponding subframe. The CRC is masked with a mask code having the same length as the CRC. Accordingly, a relay UE or an RN may analyze the CRC included in the PDCCH 501 or the R-PDCCH 511 of the subframe and recognize if the CSI-RS 505 or 515 exists in the subframe. Positions and patterns of the CSI-RSs 505 and 515 in the subframes should be predefined between the RN and the relay UE and between the eNB and the RN, because the RN or the eNB indicates only the existence or non-existence of the CSI-RS in the corresponding subframe. This scheme does not have to add a bit so as to indicate the existence or non-existence of a CSI-RS in a corresponding subframe and thus, may maintain efficiency in the aspect of transmit power or resource caused by the additive bit.

Referring to FIG. 5C, an RN adds a predetermined bit 531 including CSI-RS information to a PDCCH 501 of every subframe and indicates the existence or non-existence of a CSI-RS 505 in a corresponding subframe and a position and pattern of the CSI-RS 505. An eNB adds a predetermined bit 533 including CSI-RS information to an R-PDCCH 511 of every subframe and indicates the existence or non-existence of a CSI-RS 515 in a corresponding subframe. Accordingly, through the predetermined bit 531 or 533 included in the PDCCH 501 or R-PDCCH 511 of the subframe, a relay UE of the RN or an RN of the eNB may recognize the existence or non-existence of the CSI-RS 505 or 515 in the subframe and, in case of the existence of the CSI-RS 505 or 515, a position and pattern of the CSI-RS 505 or 515. This scheme has a disadvantage in that a payload of a control signal increases due to the predetermined bit and the indication the existence or non-existence of a CSI-RS. On the other hand, the scheme is capable of flexibly operating a relay system due to the ability to change, in a dynamic fashion, both the subframe transmitting a CSI-RS and a position and pattern of the CSI-RS.

The three schemes described above with respect to FIGS. 5A to 5C may be used in combination.

FIG. 6 illustrates a scheme of transmitting a CSI-RS using a non-MBSFN subframe in a communication system supporting an RN according to an exemplary embodiment of the present invention. In the exemplary embodiment of the present invention described with respect to FIG. 6, a scheme is described in which an eNB or an RN transmits a CSI-RS in a non-MBSFN subframe, and transmits information on the non-MBSFN subframe to an RN of the eNB or a relay UE of the RN. The non-MBSFN subframe is a subframe not used as a backhaul link, and denotes an SF#0 and an SF#5 transmitting a Synchronization CHannel (SCH) and an SF#4 and an SF#9 defined in the standard.

Referring to FIG. 6, an eNB and an RN may transmit CSI-RSs in an SF#0 601 and an SF#5 603 including SCHs as illustrated in FIG. 6A, or may transmit the CSI-RSs in an SF#4 611 and an SF#9 613 defined as the non-MBSFN in the standard as illustrated in FIG. 6B. The eNB and the RN transmit a CSI-RS using at least one non-MBSFN subframe (i.e., an SF#0, an SF#4, an SF#5, and an SF#9) and then, transmit, through system information, information on the non-MBSFN subframe to an RN of the eNB and a relay UE of the RN. Regarding the transmitting of the CSI-RS in the non-MBSFN subframe, when allocating a CSI-RS to a different subframe other than the non-MBSFN subframe, the different subframe might be used as an MBSFN subframe and thus the CSI-RS is transmitted in the different subframe. The transmitting of the CSI-RS in the non-MBSFN subframe prevents such a circumstance.

The above scheme using the non-MBSFN subframe can be used only in an RN. A subframe for an RN to transmit a CSI-RS is restricted to the non-MBSFN subframe and, instead of being restricted to the non-MBSFN subframe, a subframe for an eNB to transmit a CSI-RS may be selected from all subframes.

Figure 7:
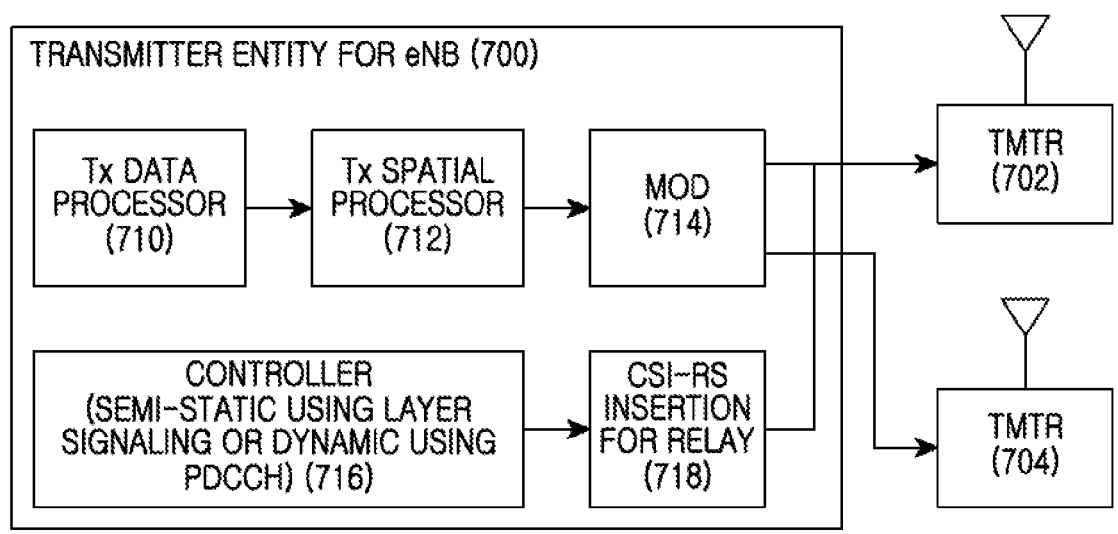
FIG. 7 is a block diagram illustrating a construction of an enhanced Node B (eNB) in an RN-support communication system according to an exemplary embodiment of the present invention.

FIG. 7 is a block diagram illustrating a construction of an eNB in an RN-support communication system according to an exemplary embodiment of the present invention.

Referring to FIG. 7, the eNB includes a transmitter entity 700 and a plurality of transmitters (TMTRs) 702 and 704. The transmitter entity 700 includes a transmission (Tx) data processor 710, a Tx spatial processor 712, a modulator (MOD) 714, a controller 716, and a CSI-RS inserter 718.

The transmitter entity 700 performs a process and control for transmitting a CSI-RS to an RN through a backhaul link. The Tx data processor 710 processes data to be transmitted to the RN, and the Tx spatial processor 712 allocates, to spatial sub-channels, the data from the Tx data processor 710 and transmits the allocated data to the MOD 714. The MOD 714 modulates the input data according to a preset modulation scheme and outputs the modulated data to the plurality of TMTRs 702 and 704. The TMTRs 702 and 704 up-convert and filter modulated signals, and transmit the signals through antennas.

The controller 716 controls and processes a function for selecting a subframe to transmit a CSI-RS for a plurality of RNs and transmitting, through higher layer signaling, a broadcasting channel, a PDSCH, or a PDCCH, information for indicating the subframe transmitting the CSI-RS and/or a position and pattern of the CSI-RS. The controller 716 controls and processes a function for selecting a non-MBSFN subframe and transmitting the CSI-RS. The controller 716 controls and processes a function for transmitting a CSI-RS to an RN according to the schemes of FIGS. 3 to 6. The CSI-RS inserter 718 adds a CSI-RS to a subframe selected according to the control of the controller 716.

Figure 8:
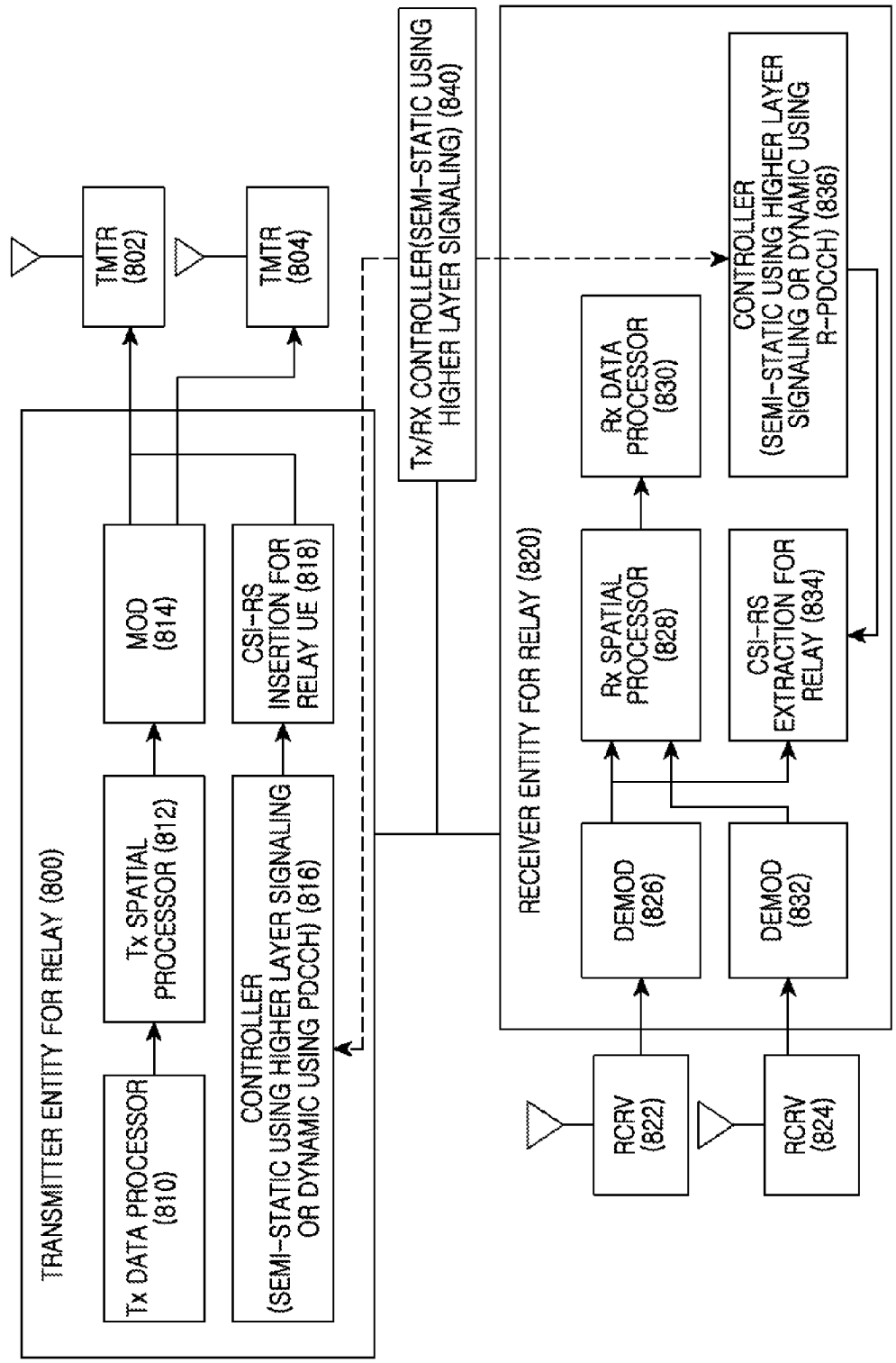
FIG. 8 is a block diagram illustrating a construction of an RN in an RN-support communication system according to an exemplary embodiment of the present invention.

FIG. 8 is a block diagram illustrating a construction of an RN in an RN-support communication system according to an exemplary embodiment of the present invention.

Referring to FIG. 8, the RN includes a transmitter entity 800, a plurality of TMTRs 802 and 804, a receiver entity 820, a plurality of receivers (RCRVs) 822 and 824, and a transmission/reception (Tx/Rx) controller 840. The transmitter entity 800 includes a Tx data processor 810, a Tx spatial processor 812, a MOD 814, a controller 816, and a CSI-RS inserter 818. The receiver entity 820 includes a plurality of demodulators (DEMODs) 826 and 832, an Rx spatial processor 828, an Rx data processor 830, a CSI-RS extractor 834, and a controller 836.

The Tx/Rx controller 840 determines if the RN is to perform a transmission operation or a reception operation, and controls the transmitter entity 800 or the receiver entity 820 to operate according to the determination.

The transmitter entity 800 controls and processes a function for transmitting a signal to an eNB through a backhaul link, and transmitting a signal to a relay UE through an access link. The transmitter entity 800 performs a process and control for transmitting a CSI-RS to the relay UE through the access link according to the present invention. The Tx data processor 810 processes data to be transmitted to the relay UE, and the Tx spatial processor 812 allocates, to spatial sub-channels, the data from the Tx data processor 810 and transmits the allocated data to the MOD 814. The MOD 814 modulates the input data according to a preset modulation scheme, and outputs the modulated data to the plurality of TMTRs 802 and 804. The TMTRs 802 and 804 up-convert and filter modulated signals, and transmit the signals through antennas.

The controller 816 of the transmitter entity 800 controls and processes a function for selecting a subframe to transmit a CSI-RS for a plurality of relay UEs, and transmitting, through higher layer signaling, a broadcasting channel, a PDSCH or a PDCCH, information for indicating the subframe transmitting the CSI-RS and/or a position and pattern of the CSI-RS. The controller 816 may select, as a CSI-RS transmission subframe, one DL subframe among subframes other than a subframe transmitting a CSI-RS of an eNB. The controller 816 controls and processes a function for transmitting the CSI-RS using a non-MBSFN subframe. The controller 816 controls and processes a function for transmitting a CSI-RS to a UE according to the schemes of FIGS. 3 to 6. The CSI-RS inserter 818 adds the CSI-RS to the subframe selected according to the control of the controller 816.

The receiver entity 820 controls and processes a function for receiving a signal from an eNB through a backhaul link, and receiving a signal from a relay UE through an access link. The receiver entity 820 performs a process and control for receiving a CSI-RS from the eNB through the backhaul link according to an exemplary embodiment of the present invention. The plurality of DEMODs 826 and 832 demodulate signals, which are filtered and down-converted in the plurality of RCRVs 822 and 824, according to a preset scheme, and provide the demodulated signals to the Rx spatial processor 828 and the CSI-RS extractor 834. The Rx spatial processor 828 and the Rx data processor 830 process data that is allocated to the RN in signals provided from the DEMODs 826 and 832.

The controller 836 of the receiver entity 820 recognizes a subframe transmitting a CSI-RS for an RN from an eNB, depending on a signal provided from the Tx/Rx controller 840, and determines a position and pattern of the CSI-RS for receiving the CSI-RS, in the subframe. The controller 836 may determine the subframe including the CSI-RS and the position and pattern of the CSI-RS, through higher layer signaling, a broadcasting channel, a PDSCH or a PDCCH received from the eNB, or may determine if a CSI-RS exists in a subframe depending on whether the subframe is a non-MBSFN subframe. The controller 836 controls and processes a function for receiving a CSI-RS transmitted from an eNB according to the schemes of FIGS. 3 to 6. The CSI-RS extractor 834 extracts a CSI-RS from the subframe selected according to the control of the controller 836.

Figure 9:
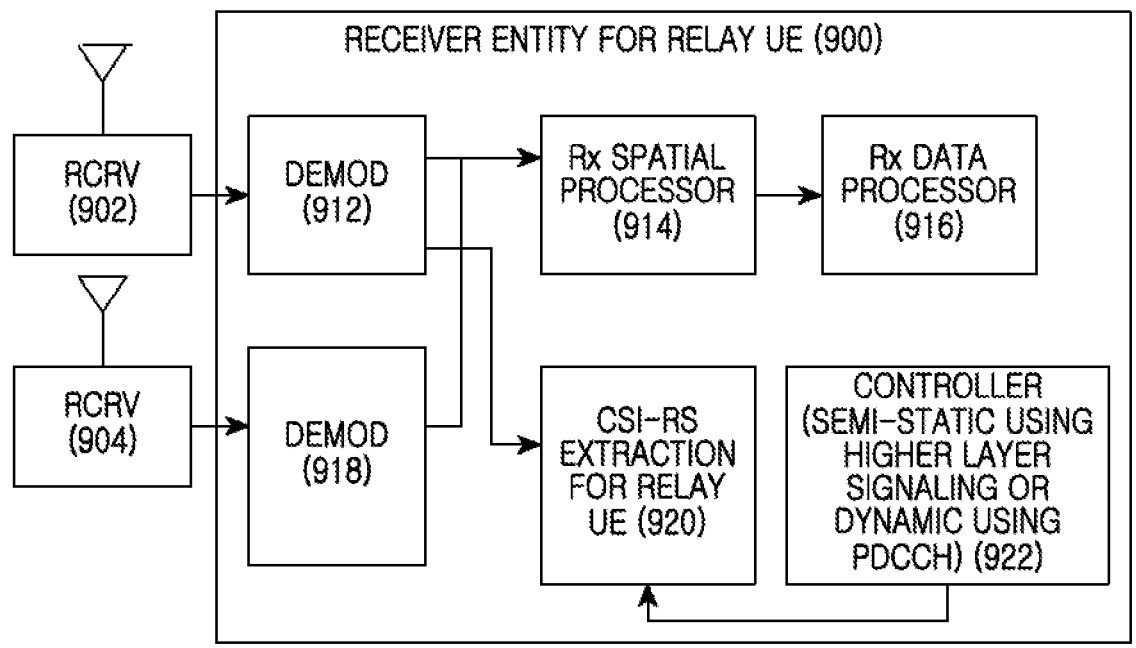
FIG. 9 is a block diagram illustrating a construction of a User Equipment (UE) in an RN-support communication system according to an exemplary embodiment of the present invention.

FIG. 9 is a block diagram illustrating a construction of a UE in an RN-support communication system according to an exemplary embodiment of the present invention.

Referring to FIG. 9, the UE includes a receiver entity 900 and a plurality of RCRVs 902 and 904. The receiver entity 900 includes a plurality of DEMODs 912 and 918, an Rx spatial processor 914, an Rx data processor 916, a CSI-RS extractor 920, and a controller 922.

The receiver entity 900 performs a process and control for receiving a CSI-RS from an RN through an access link. The plurality of DEMODs 912 and 918 demodulate signals, which are filtered and down-converted in the plurality of RCRVs 902 and 904, according to a preset scheme, and provide the demodulated signals to the Rx spatial processor 914 and the CSI-RS extractor 920. The Rx spatial processor 914 and the Rx data processor 920 process data that is allocated to the UE in signals provided from the DEMODs 912 and 918.

The controller 922 recognizes a subframe transmitting a CSI-RS for a relay UE, and determines, in the subframe, a position and pattern of the CSI-RS for receiving the CSI-RS. The controller 922 may determine a subframe including the CSI-RS and a position and pattern of the CSI-RS, through higher layer signaling, a broadcasting channel, a PDSCH or a PDCCH received from an RN, or may determine if a CSI-RS exists in a subframe depending on whether the subframe is a non-MBSFN subframe. The controller 922 controls and processes a function for receiving a CSI-RS transmitted from an RN according to the schemes of FIGS. 3 to 6. The CSI-RS extractor 920 extracts a CSI-RS from the subframe selected according to the control of the controller 922.

Figure 10:
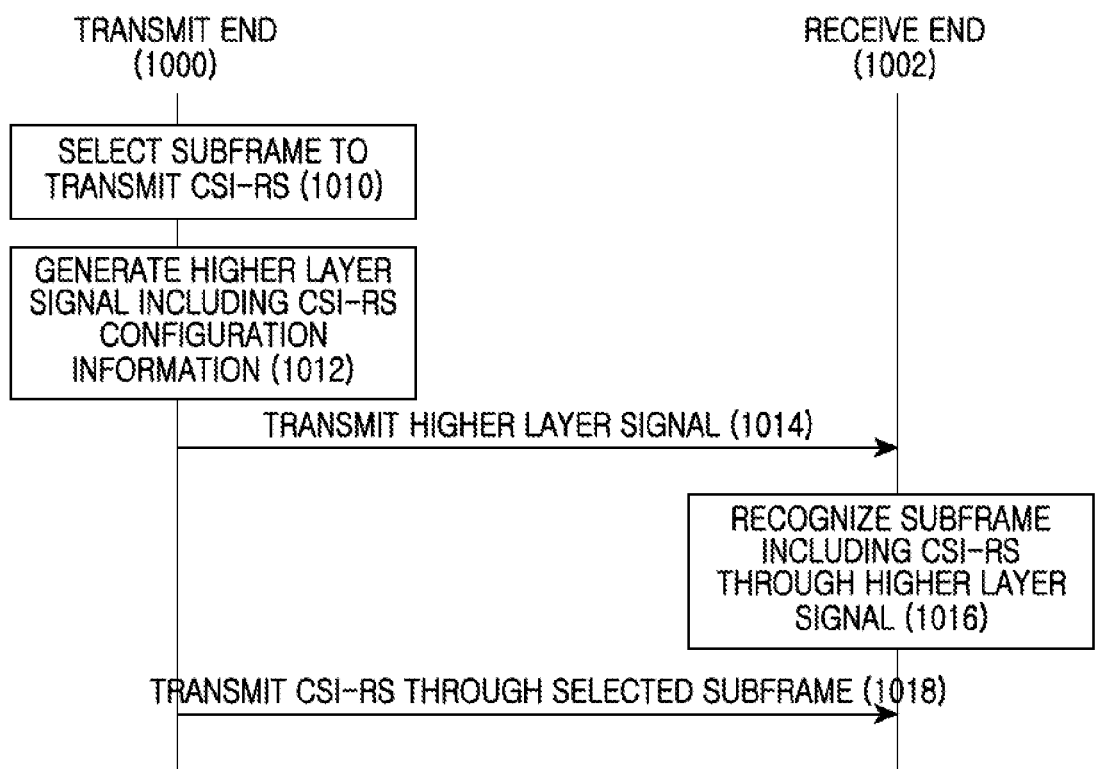
FIG. 10 is a ladder diagram illustrating a procedure of a transmission/reception end for a semi-static CSI-RS transmission/reception scheme in an RN-support communication system according to an exemplary embodiment of the present invention.

FIG. 10 illustrates a procedure of a transmission/reception end for a semi-static CSI-RS transmission/reception scheme in an RN-support communication system according to an exemplary embodiment of the present invention. The transmit end denotes an eNB or RN transmitting a CSI-RS, and the receive end denotes an RN or relay UE receiving a CSI-RS.

Referring to FIG. 10, in step 1010, the transmit end 1000 selects a DL subframe to transmit a CSI-RS. If the transmit end 1000 is an RN, the transmit end 1000 may select one subframe from the remaining subframes excepting a subframe receiving a CSI-RS from an eNB among DL subframes.

In step 1012, the transmit end 1000 generates a higher layer signal including CSI-RS configuration information and then, in step 1014, transmits the generated higher layer signal to the receive end 1002. The higher layer signal may include only a number of a subframe transmitting a CSI-RS, or may additionally include a position and pattern of the CSI-RS in the subframe. When the higher layer signal does not include the position and pattern of the CSI-RS, the position and pattern of the CSI-RS should be predefined between the transmit end 1000 and the receive end 1002.

In step 1016, the receive end 1002 recognizes the subframe transmitting the CSI-RS from the transmit end 1000, through the received higher layer signal and, in step 1018, the transmit end 1000 transmits a CSI-RS to the receive end 1002 through the selected subframe. For convenience of description, the higher layer signal is described as an example, but the transmit end 1000 may transmit the CSI-RS configuration information through a broadcasting channel or a PDSCH.

Figure 11:
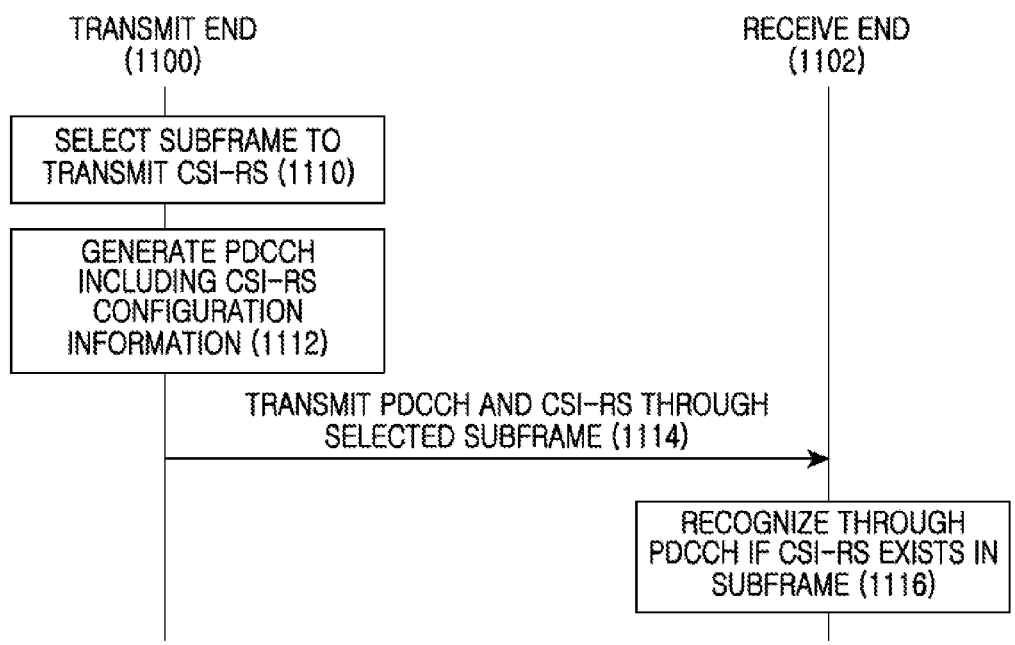
FIG. 11 is a ladder diagram illustrating a procedure of a transmission/reception end for a dynamic CSI-RS transmission/reception scheme in an RN-support communication system according to an exemplary embodiment of the present invention.

FIG. 11 illustrates a procedure of a transmission/reception end for a dynamic CSI-RS transmission/reception scheme in an RN-support communication system according to an exemplary embodiment of the present invention. The transmit end denotes an eNB or RN transmitting a CSI-RS, and the receive end denotes an RN or relay UE receiving a CSI-RS.

Referring to FIG. 11, in step 1110, the transmit end 1100 selects a DL subframe to transmit a CSI-RS. If the transmit end 1100 is an RN, the transmit end 1100 may select one subframe from the remaining subframes other than a subframe receiving a CSI-RS from an eNB among DL subframes.

In step 1112, the transmit end 1100 generates a PDCCH including CSI-RS configuration information and then, in step 1114, transmits a subframe including the generated PDCCH and a CSI-RS, to the receive end 1102. The PDCCH may indicate only if the CSI-RS is included in the subframe, and may additionally indicate a position and pattern of the CSI-RS in the subframe. For example, as illustrated in FIG. 5A or 5B, an indication bit or CRC masking may indicate if a CSI-RS is included in a corresponding subframe or, as illustrated in FIG. 5C, a predetermined bit may be added and indicate both the inclusion or non-inclusion of a CSI-RS and a position and pattern of the CSI-RS. If the PDCCH only indicates whether the CSI-RS is included in the subframe, the position and pattern of the CSI-RS should be predefined between the transmit end 1100 and the receive end 1102.

Then, in step 1116, the receive end 1102 recognizes if a CSI-RS exists through a PDCCH of a current subframe.

Figure 12:
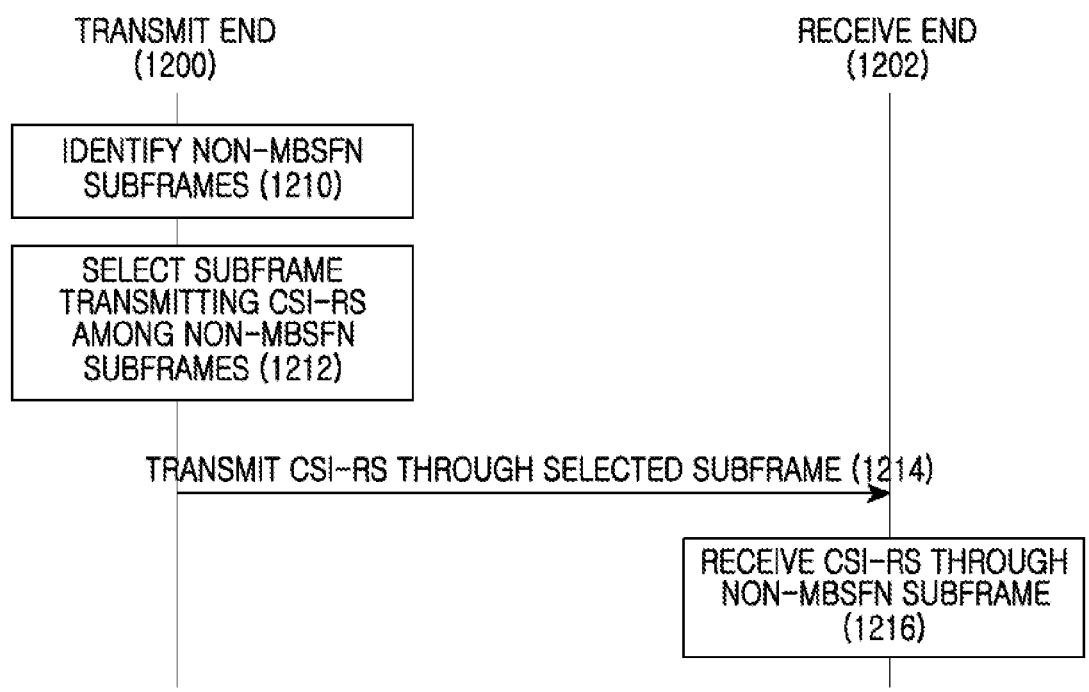
FIG. 12 is a ladder diagram illustrating a procedure of a transmission/reception end for a scheme of transmitting a CSI-RS using a non-MBSFN subframe in an RN-support communication system according to an exemplary embodiment of the present invention.

FIG. 12 illustrates a procedure of a transmission/reception end for a scheme of transmitting a CSI-RS using a non-MBSFN subframe in an RN-support communication system according to an exemplary embodiment of the present invention. The transmit end denotes an eNB or RN transmitting a CSI-RS, and the receive end denotes an RN or relay UE receiving a CSI-RS.

Referring to FIG. 12, in step 1210, the transmit end 1200 identifies non-MBSFN subframes and, in step 1212, selects a subframe to transmit a CSI-RS among the non-MBSFN subframes. The non-MBSFN subframe is a subframe not used as a backhaul link, and denotes an SF#0 and an SF#5 transmitting an SCH and an SF#4 and an SF#9 defined in the standard. The transmit end 1200 adds information on the non-MB SFN subframe to system information and transmits the information to the receive end 1202.

In step 1214, the transmit end 1200 transmits a CSI-RS to the receive end 1202 through the selected subframe. In step 1216, the receive end 1202 receives the CSI-RS from the non-MBSFN subframe received through the system information, and uses the CSI-RS for forward link channel measurement.

As described above, exemplary embodiments of the present invention are capable of efficiently operating an RN of impossible simultaneous transmission and reception and improving the flexibility of a system by, while transmitting a CSI-RS of an eNB and a CSI-RS of an RN at different subframes, changing the subframe transmitting the CSI-RS of the eNB and/or the CSI-RS of the RN in a semi-static or dynamic fashion or determining to transmit the CSI-RS at a non-MBSFN subframe, and informing an RN or a relay UE of information of the subframe including the CSI-RS in a communication system supporting an RN.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a Channel State Information-Reference Symbol (CSI-RS) in a transmit end, the method comprising:
    selecting a subframe to transmit a CSI-RS, from DownLink (DL) subframes;
    transmitting, to a receive end, identifying information indicating that a CSI-RS is transmitted at the selected subframe; and
    transmitting a CSI-RS at the selected subframe,
    wherein, when the transmit end comprises a Relay Node (RN), the selecting of the subframe to transmit the CSI-RS comprises:
        identifying by the RN, a subframe at which the RN receives a CSI-RS from an enhanced Node B (eNB);
        identifying, by the RN, subframes other than the subframe receiving the CSI-RS of the eNB, from DL subframes for a relay User Equipment (UE); and
        selecting, by the RN, a subframe at which the eNB transmits a CSI-RS to a macro UE from among the identified subframes.

2. The method of claim 1, wherein selecting the subframe to transmit the CSI-RS comprises selecting at least one DL subframe not used as Multicast Broadcast Single Frequency Network (MBSFN) subframes.

3. The method of claim 1, wherein the identifying information comprises at least one of a number of the subframe transmitting the CSI-RS, the existence or non-existence of the CSI-RS in the subframe, a position of the CSI-RS, and a pattern of the CSI-RS.

4. The method of claim 1, wherein the identifying information is transmitted through any one of higher layer signaling, a broadcasting channel, and a Physical Downlink Shared CHannel (PDSCH) or a Physical Downlink Control CHannel (PDCCH).

5. The method of claim 4, further comprising:
    when the identifying information is transmitted through the PDCCH, adding, to a PDCCH of each subframe, information indicating the transmission or non-transmission of the CSI-RS, or masking a Cyclic Redundancy Check (CRC) of the subframe transmitting the CSI-RS.

6. A method for receiving a Channel State Information-Reference Symbol (CSI-RS) in a receive end, the method comprising:
    receiving identifying information indicating that a CSI-RS is transmitted at a specific frame, from a transmit end; and
    receiving a CSI-RS at the specific subframe according to the received identifying information,
    wherein, when the receive end comprises a Relay Node (RN), further comprising:
        identifying, by the RN, a subframe at which the RN receives a CSI-RS from an enhanced Node B (eNB);
        identifying subframes besides the subframe receiving the CSI-RS of the eNB, from DL subframes for a relay User Equipment (UE); and
        selecting, by the RN, a subframe at which the eNB transmits a CSI-RS to a macro UE from among the identified subframes.

7. The method of claim 6, wherein the receiving of the CSI-RS at the specific subframe according to the received information comprises:
   identifying a subframe not used as a Multicast Broadcast Single Frequency Network (MBSFN) subframe, based on the received information; and
   receiving a CSI-RS from the subframes not used as the MBSFN subframe.

8. The method of claim 6, wherein the identifying information comprises at least one of a number of the subframe transmitting the CSI-RS, the existence or non-existence of the CSI-RS in the subframe, a position of the CSI-RS, and a pattern of the CSI-RS.

9. The method of claim 6, wherein the identifying information is transmitted through any one of higher layer signaling, a broadcasting channel, and a Physical Downlink Shared CHannel (PDSCH) or a Physical Downlink Control CHannel (PDCCH).

10. An apparatus for transmitting a Channel State Information-Reference Symbol (CSI-RS) in a transmit end, the apparatus comprising:
    a controller for selecting a subframe to transmit a CSI-RS, from DownLink (DL) subframes;
    an inserter for inserting a CSI-RS into the selected subframe; and
    a transmitter for transmitting, to a receive end, identifying information indicating that a CSI-RS is transmitted at the selected subframe, and a subframe into which the CSI-RS is inserted,
    wherein, when the transmit end comprises a Relay Node (RN), the controller identifies a subframe at which the RN receives a CSI-RS from an enhanced Node B (eNB), identifies subframes besides the subframe receiving the CSI-RS of the eNB, from DL subframes for a relay User Equipment (UE), and selects a subframe at which the eNB transmits a CSI-RS to a macro UE from among the identified subframes.

11. The apparatus of claim 10, wherein the controller selects at least one subframe from at least one of DL subframes not used as Multicast Broadcast Single Frequency Network (MBSFN) subframes.

12. The apparatus of claim 10, wherein the identifying information comprises at least one of a number of the subframe transmitting the CSI-RS, the existence or non-existence of the CSI-RS in the subframe, a position of the CSI-RS, and a pattern of the CSI-RS.

13. The apparatus of claim 10, wherein the identifying information is transmitted through any one of higher layer signaling, a broadcasting channel, and a Physical Downlink Shared CHannel (PDSCH) or a Physical Downlink Control CHannel (PDCCH).

14. The apparatus of claim 13, wherein, when the controller transmits the identifying information through the PDCCH, the controller adds, to a PDCCH of each subframe, information indicating the transmission or non-transmission of the CSI-RS, or masks a Cyclic Redundancy Check (CRC) of the subframe transmitting the CSI-RS.

15. An apparatus for receiving a Channel State Information-Reference Symbol (CSI-RS) in a receive end, the apparatus comprising:
    a receiver for receiving identifying information indicating that a CSI-RS is transmitted at a specific frame, from a transmit end;
    a controller for determining that a CSI-RS exists in a specific subframe according to the received identifying information; and
    an extractor for extracting a CSI-RS from the specific subframe according to the determination of the controller,
    wherein, when the receive end comprises a Relay Node (RN), the controller identifies a subframe at which the RN receives a CSI-RS from an enhanced Node B (eNB), identifies subframes besides the subframe receiving the CSI-RS of the eNB, from DL subframes for a relay User Equipment (UE), and selects a subframe at which the eNB transmits a CSI-RS to a macro UE from among the identified subframes.

16. The apparatus of claim 15, wherein the controller acquires information on a DL subframe not used as a Multicast Broadcast Single Frequency Network (MBSFN) subframe, through system information, and
    wherein the extractor extracts a CSI-RS from the subframe not used as the MBSFN subframe according to the determination of the controller.

17. The apparatus of claim 15, wherein the identifying information comprises at least one of a number of the subframe transmitting the CSI-RS, the existence or non-existence of the CSI-RS in the subframe, a position of the CSI-RS, and a pattern of the CSI-RS.

18. The apparatus of claim 15, wherein the identifying information is transmitted through any one of higher layer signaling, a broadcasting channel, and a Physical Downlink Shared CHannel (PDSCH) or a Physical Downlink Control CHannel (PDCCH).

* * * * *